US012705503B2

(12) United States Patent
Bambha et al.

(10) Patent No.: US 12,705,503 B2
(45) Date of Patent: Aug. 11, 2026

(54) STOCHASTIC CONTENT CANDIDATE SELECTION FOR CONTENT RECOMMENDATION

(71) Applicant: ROKU, INC., San Jose, CA (US)

(72) Inventors: Abhishek Bambha, Burlimgame, CA (US); Rohit Mahto, San Jose, CA (US); Nam Vo, San Jose, CA (US); Zidong Wang, San Jose, CA (US); Fei Xiao, San Jose, CA (US)

(73) Assignee: Roku, Inc., San Jose, CA (US)

(*) Notice: Subject to any disclaimer, the term of this patent is extended or adjusted under 35 U.S.C. 154(b) by 889 days.

(21) Appl. No.: 17/937,497

(22) Filed: Oct. 3, 2022

(65) Prior Publication Data

US 2024/0112041 A1 Apr. 4, 2024

(51) Int. Cl.
*G06F 7/00* (2006.01)
*G06N 5/02* (2023.01)
*G06N 5/048* (2023.01)

(52) U.S. Cl.
CPC ............... *G06N 5/02* (2013.01); *G06N 5/048* (2013.01)

(58) Field of Classification Search
CPC ............. G06F 16/3347; G06F 16/3344; G06F 16/332; G06F 16/3322; G06F 16/35;
(Continued)

(56) References Cited

U.S. PATENT DOCUMENTS

| | | | |
|---|---|---|---|
| 8,725,559 | B1 | 5/2014 | Kothari et al. |
| 9,299,331 | B1 | 3/2016 | Durham et al. |

(Continued)

FOREIGN PATENT DOCUMENTS

| | | | |
|---|---|---|---|
| EP | 2817970 | B1 | 12/2022 |
| EP | 21817970 | B1 | 12/2022 |
| WO | WO 2013/126589 | A1 | 12/2014 |

OTHER PUBLICATIONS

Extended European Search Report directed to related European Patent Application No. 23201055.3, mailed Mar. 28, 2024, 6 pages.

(Continued)

*Primary Examiner* — Mohammad A Sana
(74) *Attorney, Agent, or Firm* — Sterne, Kessler, Goldstein & Fox P.L.L.C.

(57) ABSTRACT

Disclosed herein are system, apparatus, article of manufacture, method and/or computer program product embodiments, and/or combinations and sub-combinations thereof, for stochastic candidate selection for content recommendation. An example embodiment operates by a computer-implemented method for stochastic candidate selection for content recommendation. The method includes receiving, by at least one computer processor, a first plurality of content candidates and selecting a second plurality of content candidates from the first plurality of content candidates. The method further include ranking the second plurality of content candidates based on one or more parameters and selecting a third plurality of content candidates from the ranked second plurality of content candidates. The method can further include displaying the third plurality of content candidates using a display device.

17 Claims, 5 Drawing Sheets

(58) Field of Classification Search
CPC ........... G06F 16/24542; G06F 16/2455; G06F 16/24522; G06F 16/2425; G06F 16/2456; G06F 16/2465; G06F 16/2471; G06F 16/24575; G06F 16/2453; G06F 16/2457; G06F 16/215; G06F 16/243; G06F 16/244; G06F 16/245; G06F 16/248; G06F 16/93; G06F 16/383; G06F 16/285; G06F 16/9535; G06F 16/3329; G06F 16/90332; G06F 16/90335; G06F 16/217; G06F 16/353; G06N 5/04; G06N 5/01; G06N 5/02; G06N 5/048; G06N 5/022; G06N 20/00; G06N 20/20; G06N 5/018
See application file for complete search history.

(56) References Cited

U.S. PATENT DOCUMENTS

| | | | |
|---|---|---|---|
| 11,838,592 | B1 | 12/2023 | Sanghavi et al. |
| 11,895,372 | B1 | 2/2024 | Sanghavi et al. |
| 12,200,310 | B2 | 1/2025 | Sanghavi et al. |
| 2003/0001846 | A1 | 1/2003 | Davis et al. |
| 2008/0276270 | A1 | 11/2008 | Kotaru et al. |
| 2009/0037279 | A1 | 2/2009 | Chockalingam et al. |
| 2010/0088406 | A1 | 4/2010 | Yu et al. |
| 2010/0318544 | A1 | 12/2010 | Nicolov |
| 2011/0052012 | A1 | 3/2011 | Bambha et al. |
| 2011/0082824 | A1 | 4/2011 | Allison et al. |
| 2011/0208852 | A1 | 8/2011 | Looney et al. |
| 2014/0195345 | A1 | 7/2014 | Lyren |
| 2014/0297739 | A1 | 10/2014 | Stein et al. |
| 2015/0105145 | A1 | 4/2015 | Scheer |
| 2016/0007065 | A1 | 1/2016 | Peles et al. |
| 2016/0092935 | A1 | 3/2016 | Bradley et al. |
| 2016/0127783 | A1 | 5/2016 | Garcia Navarro |
| 2016/0247189 | A1 | 8/2016 | Shirley et al. |
| 2016/0299906 | A1* | 10/2016 | Cartoon .............. G06F 16/4387 |
| 2017/0031920 | A1 | 2/2017 | Manning et al. |
| 2017/0061528 | A1* | 3/2017 | Arora .................... G06F 16/958 |
| 2017/0091817 | A1 | 3/2017 | Lenhart et al. |
| 2017/0243244 | A1 | 8/2017 | Trabelsi et al. |
| 2017/0249058 | A1* | 8/2017 | Fisher ..................... G06F 16/41 |
| 2019/0114347 | A1 | 4/2019 | Johansen et al. |
| 2019/0243923 | A1 | 8/2019 | Kveton et al. |
| 2020/0311568 | A1* | 10/2020 | Xue ....................... G06N 20/00 |
| 2020/0401634 | A1* | 12/2020 | Duan .................... G06F 16/958 |
| 2021/0004421 | A1 | 1/2021 | Zadorojniy et al. |
| 2021/0042830 | A1 | 2/2021 | Burke |
| 2022/0150591 | A1 | 5/2022 | Miller |
| 2022/0232282 | A1 | 7/2022 | Ramirez et al. |
| 2022/0309543 | A1 | 9/2022 | Kushner et al. |
| 2022/0405322 | A1* | 12/2022 | Rao ....................... G06F 16/738 |
| 2022/0414754 | A1 | 12/2022 | Afshar |
| 2024/0022798 | A1 | 1/2024 | Mahto et al. |
| 2024/0031616 | A1 | 1/2024 | Amir et al. |
| 2024/0056644 | A1 | 2/2024 | Sanghavi et al. |
| 2024/0064375 | A1 | 2/2024 | Sanghavi et al. |
| 2024/0137621 | A1 | 4/2024 | Sanghavi et al. |
| 2025/0014087 | A1* | 1/2025 | Suram ................ G06Q 30/0603 |
| 2025/0024104 | A1 | 1/2025 | Sanghavi et al. |
| 2025/0063232 | A1 | 2/2025 | Sanghavi et al. |

OTHER PUBLICATIONS

Xiang, B. et al. "*Research of Mobile Recommendation System Based on Hybrid Recommendation Technology*," 3rd International Conference on Consumer Electronics, Communications and Networks, IEEE, Nov. 20, 2013, 5 pages.
Extended European Search Report directed to European Patent Application No. 23189817.2, mailed Nov. 20, 2023; 12 pages.
U.S. Appl. No. 18/536,627, inventors Sanghavi, M., et al., entitled "Rendering a Dynamic Endemic Banner on Streaming Platforms Using Content Recommendations Systems and Content Modeling for User Exploration and Awareness," filed Dec. 12, 2023.
"Reservoir sampling, Wikipedia.org, https://web.archive.org/web/20220205220762/https://en.wikipedia.org/wiki/Reservoir_sampling, Feb. 5, 2022 (accessed May 19, 2023 using Wayback Machine), 8 pages.".
Co-pending U.S. Appl. No. 17/882,184, inventors Sanghavi, M., et al., filed Aug. 5, 2022 (Not Published).

* cited by examiner

STOCHASTIC CONTENT CANDIDATE SELECTION FOR CONTENT RECOMMENDATION

BACKGROUND

Field

This disclosure is generally directed to content recommendation, and more particularly to stochastic content candidate selection for the content recommendation.

Background

Content, such as a movie or TV show, is typically displayed on a television or other display screen for watching by users. The content to be displayed to a user can be selected from a limited set of contents. For example, a plurality of videos (e.g., movies, TV shows, video clips, etc.) can be chosen from a limited set of videos to be displayed to the user. The plurality of videos can be selected based on the user's preferences. After a period of time, the content is shown and recommended to the user will almost become unchanged and very limited number of new content will be shown to the user. Therefore, the user may not see any (or may see very limited) new content.

SUMMARY

Provided herein are system, apparatus, article of manufacture, method and/or computer program product embodiments, and/or combinations and sub-combinations thereof, for stochastic candidate selection for content recommendation. Although some embodiments are discussed with respect to video (e.g., movie, TV show, video clip, etc.) recommendation, the embodiments of this disclosure are not limited to these examples and the embodiments of this disclosure can be used for other content recommendation such as audio recommendation, image recommendation, text recommendation, graphic recommendation, gaming application recommendation, advertisement recommendation, programming content recommendation, public service content recommendation, government content recommendation, local community content recommendation, software recommendation, or the like.

An example embodiment operates by a computer-implemented method for stochastic candidate selection for content recommendation. The method includes receiving, by at least one computer processor, a first plurality of content candidates and selecting a second plurality of content candidates from the first plurality of content candidates. The method further includes ranking the second plurality of content candidates based on one or more parameters and selecting a third plurality of content candidates from the ranked second plurality of content candidates. The method can further include displaying the third plurality of content candidates using a display device.

In some embodiments, selecting the second plurality of content candidates can include randomly selecting the second plurality of content candidates. In some embodiments, randomly selecting the second plurality of content candidates can include applying a weighted function to the first plurality of content candidates to randomly select the second plurality of content candidates.

In some embodiments, one or more weights of the weighted function are determined based on the one or more parameters and the one or more parameters are associated with user preferences. In some embodiments, the one or more weights of the weighted function are determined using a machine learning mechanism. In some embodiments, the method can include receiving one or more content candidate selections selected from the third plurality of content candidates and modifying one or more weights of the weighted function based on the one or more content candidate selections.

In some embodiments, the first plurality of content candidates are ranked based on a first criteria and the one or more parameters are associated with a second criteria. The first criteria can be different from the second criteria. In some embodiments, the first criteria can include a plurality of popularity scores, each one of the plurality of popularity scores being associated with each one the first plurality of content candidates. The second criteria can include a plurality of relevance scores, each one of the plurality of relevance scores being associated with each one the second plurality of content candidates.

In some embodiments, the method can further include selecting a fourth plurality of content candidates from the first plurality of content candidates and comparing the fourth plurality of content candidates with the second plurality of content candidates. The method can further include removing, from the fourth plurality of content candidates, one or more candidates that are same in the fourth plurality of content candidates and the second plurality of content candidates to generate a fifth plurality of content candidates. The method can also include ranking the fifth plurality of content candidates based on the one or more parameters and selecting a sixth plurality of content candidates from the ranked fifth plurality of content candidates. The method can also include displaying the sixth plurality of content candidates using the display device.

An example embodiment operates by a system that includes at least one processor configured to perform operations including receiving a first plurality of content candidates and randomly selecting a second plurality of content candidates from the first plurality of content candidates. The operation can further include ranking the second plurality of content candidates based on one or more parameters and selecting a third plurality of content candidates from the ranked second plurality of content candidates. The operations can further include displaying the third plurality of content candidates using a display device.

An example embodiment operates by a non-transitory computer-readable medium having instructions stored thereon that, when executed by at least one computing device, cause the at least one computing device perform operations that include receiving a first plurality of content candidates and randomly selecting a second plurality of content candidates from the first plurality of content candidates. The operation can further include ranking the second plurality of content candidates based on one or more parameters and selecting a third plurality of content candidates from the ranked second plurality of content candidates. The operations can further include displaying the third plurality of content candidates using a display device.

BRIEF DESCRIPTION OF THE FIGURES

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Provided herein are system, apparatus, device, method and/or computer program product embodiments, and/or combinations and sub-combinations thereof, for stochastic candidate selection for content recommendation.

Figure 1:
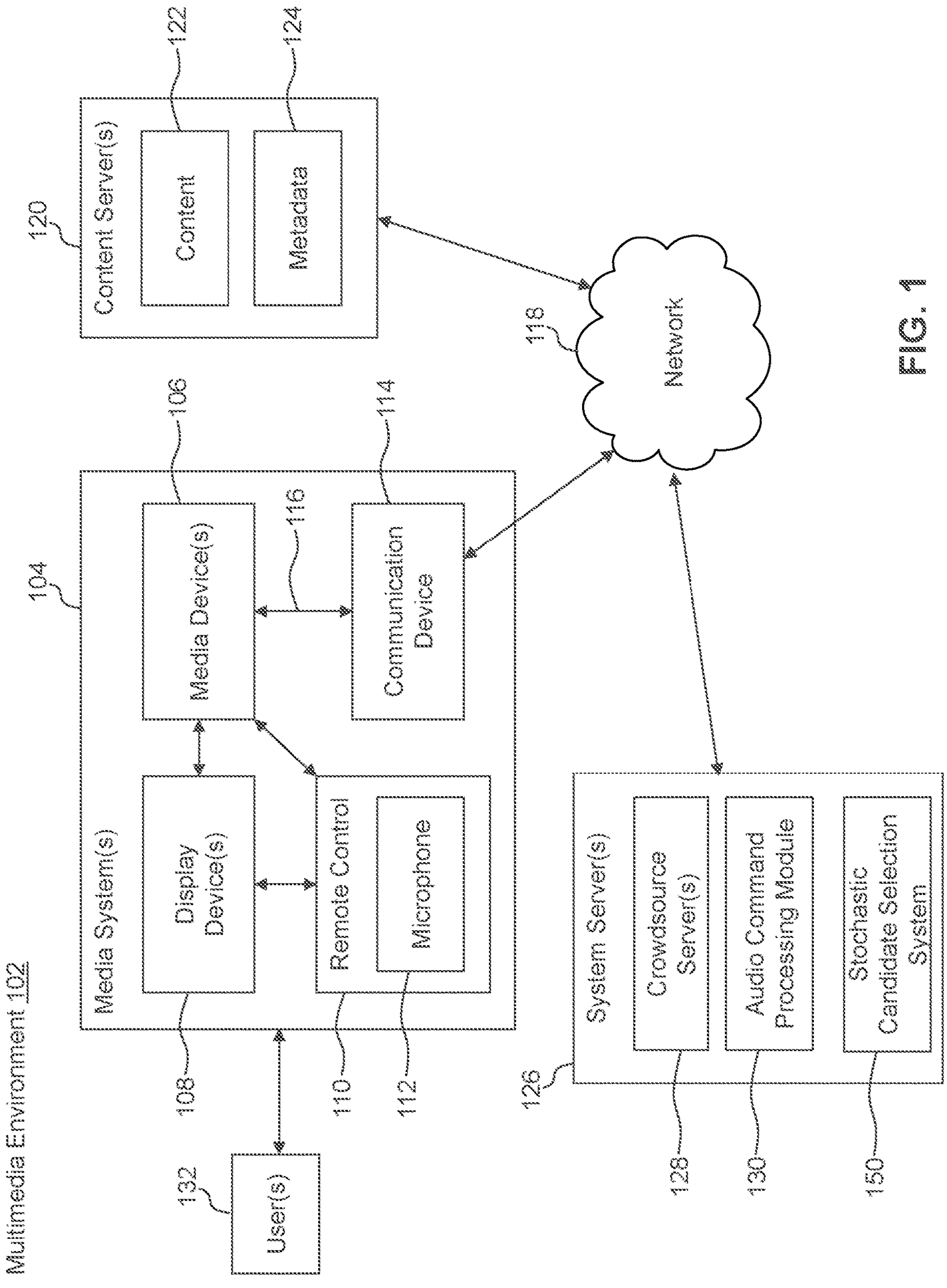
FIG. 1 illustrates a block diagram of a multimedia environment, according to some embodiments.

Various embodiments of this disclosure may be implemented using and/or may be part of a multimedia environment 102 shown in FIG. 1. It is noted, however, that multimedia environment 102 is provided solely for illustrative purposes, and is not limiting. Embodiments of this disclosure may be implemented using and/or may be part of environments different from and/or in addition to the multimedia environment 102, as will be appreciated by persons skilled in the relevant art(s) based on the teachings contained herein. An example of the multimedia environment 102 shall now be described.

Multimedia Environment

FIG. 1 illustrates a block diagram of a multimedia environment 102, according to some embodiments. In a non-limiting example, multimedia environment 102 may be directed to streaming media. However, this disclosure is applicable to any type of media (instead of or in addition to streaming media), as well as any mechanism, means, protocol, method and/or process for distributing media.

The multimedia environment 102 may include one or more media systems 104. A media system 104 could represent a family room, a kitchen, a backyard, a home theater, a school classroom, a library, a car, a boat, a bus, a plane, a movie theater, a stadium, an auditorium, a park, a bar, a restaurant, or any other location or space where it is desired to receive and play streaming content. User(s) 132 may operate with the media system 104 to select and consume content.

Each media system 104 may include one or more media devices 106 each coupled to one or more display devices 108. It is noted that terms such as "coupled," "connected to," "attached," "linked," "combined" and similar terms may refer to physical, electrical, magnetic, logical, etc., connections, unless otherwise specified herein.

Media device 106 may be a streaming media device, DVD or BLU-RAY device, audio/video playback device, cable box, and/or digital video recording device, to name just a few examples. Display device 108 may be a monitor, television (TV), computer, smart phone, tablet, wearable (such as a watch or glasses), appliance, internet of things (IoT) device, and/or projector, to name just a few examples. In some embodiments, media device 106 can be a part of, integrated with, operatively coupled to, and/or connected to its respective display device 108.

Each media device 106 may be configured to communicate with network 118 via a communication device 114. The communication device 114 may include, for example, a cable modem or satellite TV transceiver. The media device 106 may communicate with the communication device 114 over a link 116, wherein the link 116 may include wireless (such as WiFi) and/or wired connections.

In various embodiments, the network 118 can include, without limitation, wired and/or wireless intranet, extranet, Internet, cellular, Bluetooth, infrared, and/or any other short range, long range, local, regional, global communications mechanism, means, approach, protocol and/or network, as well as any combination(s) thereof.

Media system 104 may include a remote control 110. The remote control 110 can be any component, part, apparatus and/or method for controlling the media device 106 and/or display device 108, such as a remote control, a tablet, laptop computer, smartphone, wearable, on-screen controls, integrated control buttons, audio controls, or any combination thereof, to name just a few examples. In an embodiment, the remote control 110 wirelessly communicates with the media device 106 and/or display device 108 using cellular, Bluetooth, infrared, etc., or any combination thereof. The remote control 110 may include a microphone 112, which is further described below.

The multimedia environment 102 may include a plurality of content servers 120 (also called content providers, channels or sources 120). Although only one content server 120 is shown in FIG. 1, in practice the multimedia environment 102 may include any number of content servers 120. Each content server 120 may be configured to communicate with network 118.

Each content server 120 may store content 122 and metadata 124. Content 122 may include any combination of music, videos, movies, TV programs, multimedia, images, still pictures, text, graphics, gaming applications, advertisements, programming content, public service content, government content, local community content, software, and/or any other content or data objects in electronic form.

In some embodiments, metadata 124 comprises data about content 122. For example, metadata 124 may include associated or ancillary information indicating or related to writer, director, producer, composer, artist, actor, summary, chapters, production, history, year, trailers, alternate versions, related content, applications, and/or any other information pertaining or relating to the content 122. Metadata 124 may also or alternatively include links to any such information pertaining or relating to the content 122. Metadata 124 may also or alternatively include one or more indexes of content 122, such as but not limited to a trick mode index.

The multimedia environment 102 may include one or more system servers 126. The system servers 126 may operate to support the media devices 106 from the cloud. It is noted that the structural and functional aspects of the system servers 126 may wholly or partially exist in the same or different ones of the system servers 126.

The media devices 106 may exist in thousands or millions of media systems 104. Accordingly, the media devices 106 may lend themselves to crowdsourcing embodiments and, thus, the system servers 126 may include one or more crowdsource servers 128.

For example, using information received from the media devices 106 in the thousands and millions of media systems 104, the crowdsource server(s) 128 may identify similarities and overlaps between closed captioning requests issued by different users 132 watching a particular movie. Based on such information, the crowdsource server(s) 128 may determine that turning closed captioning on may enhance users' viewing experience at particular portions of the movie (for example, when the soundtrack of the movie is difficult to hear), and turning closed captioning off may enhance users' viewing experience at other portions of the movie (for example, when displaying closed captioning obstructs critical visual aspects of the movie). Accordingly, the crowdsource server(s) 128 may operate to cause closed captioning to be automatically turned on and/or off during future streamings of the movie.

The system servers 126 may also include an audio command processing module 130. As noted above, the remote control 110 may include a microphone 112. The microphone 112 may receive audio data from users 132 (as well as other sources, such as the display device 108). In some embodiments, the media device 106 may be audio responsive, and the audio data may represent verbal commands from the user 132 to control the media device 106 as well as other components in the media system 104, such as the display device 108.

In some embodiments, the audio data received by the microphone 112 in the remote control 110 is transferred to the media device 106, which is then forwarded to the audio command processing module 130 in the system servers 126. The audio command processing module 130 may operate to process and analyze the received audio data to recognize the user 132's verbal command. The audio command processing module 130 may then forward the verbal command back to the media device 106 for processing.

Figure 2:
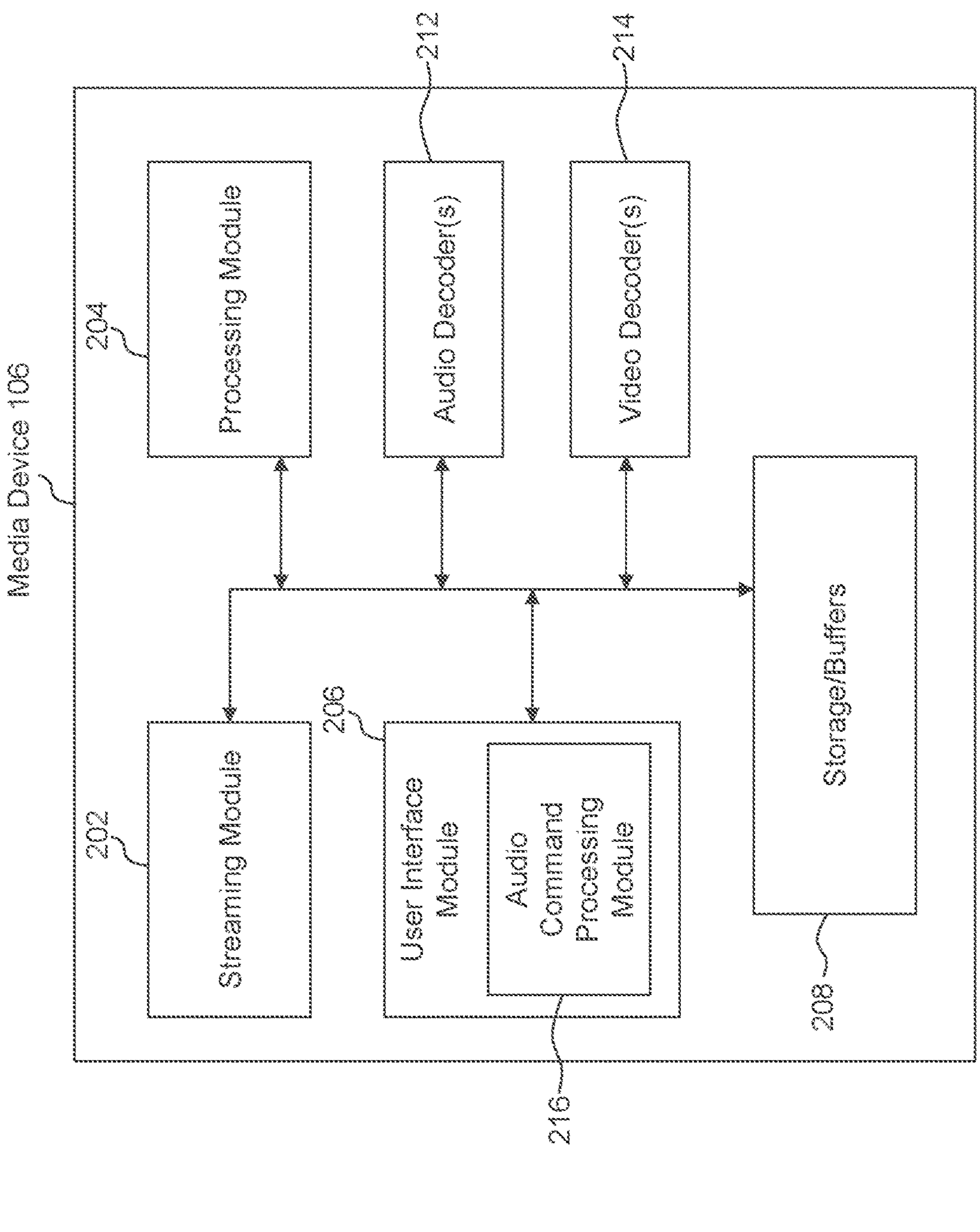
FIG. 2 illustrates a block diagram of a streaming media device, according to some embodiments.

In some embodiments, the audio data may be alternatively or additionally processed and analyzed by an audio command processing module 216 in the media device 106 (see FIG. 2). The media device 106 and the system servers 126 may then cooperate to pick one of the verbal commands to process (either the verbal command recognized by the audio command processing module 130 in the system servers 126, or the verbal command recognized by the audio command processing module 216 in the media device 106).

According to some embodiments, system servers 126 can include a stochastic candidate selection system 150. As discussed in more detail below (for example, with respect to FIGS. 3 and 4), the stochastic candidate selection system 150 can be configured to receive a first plurality of content candidates. As discussed above, the content can include any combination of music, videos, movies, TV programs, multimedia, images, still pictures, text, graphics, gaming applications, advertisements, programming content, public service content, government content, local community content, software, and/or any other content or data objects in electronic form. The content candidate can include any candidate for the content to be provided to (e.g., be displayed to) a user. In some embodiments, receiving the first plurality of content candidates can include receiving a list (e.g., information associated with) the first plurality of content candidates.

According to some embodiments, the candidate selection system 150 can be configured to select a second plurality of content candidates from the first plurality of content candidates. The candidate selection system 150 can use a statistically random (or substantially statistically random) algorithm to select the second plurality of content candidates from the first plurality of content candidates.

According to some embodiments, the candidate selection system 150 can be configured to rank the second plurality of content candidates based on one or more parameters and select a third plurality of content candidates from the ranked second plurality of content candidates to provide to (e.g., display to) the users 132. For example, the candidate selection system 150 can display the third plurality of content candidates using the media device 106 and/or the display devices 108.

Although the candidate selection system 150 is illustrated in FIG. 1 as part of the system servers 126, the embodiments of this disclosure are not limited to this example. The candidate selection system 150 can be part of the media systems 104. For example, the candidate selection system 150 can be part of the media devices 106. Additionally, or alternatively, the candidate selection system 150 can be part of the content servers 120. Additionally, or alternatively, the structural and functional aspects of the candidate selection system 150 may wholly or partially exist in the same or different ones of the system servers 126. The structural and functional aspects of the candidate selection system 150 may be decentralized between any combination of system servers 126, media devices 106, content servers 120, or the like.

FIG. 2 illustrates a block diagram of an example media device 106, according to some embodiments. Media device 106 may include a streaming module 202, processing module 204, storage/buffers 208, and user interface module 206. As described above, the user interface module 206 may include the audio command processing module 216.

The media device 106 may also include one or more audio decoders 212 and one or more video decoders 214.

Each audio decoder 212 may be configured to decode audio of one or more audio formats, such as but not limited to AAC, HE-AAC, AC3 (Dolby Digital), EAC3 (Dolby Digital Plus), WMA, WAV, PCM, MP3, OGG GSM, FLAC, AU, AIFF, and/or VOX, to name just some examples.

Similarly, each video decoder 214 may be configured to decode video of one or more video formats, such as but not limited to MP4 (mp4, m4a, m4v, f4v, f4a, m4b, m4r, f4b, mov), 3GP (3gp, 3gp2, 3g2, 3gpp, 3gpp2), OGG (ogg, oga, ogv, ogx), WMV (wmv, wma, asf), WEBM, FLV, AVI, QuickTime, HDV, MXF (OP1a, OP-Atom), MPEG-TS, MPEG-2 PS, MPEG-2 TS, WAV, Broadcast WAV, LXF, GXF, and/or VOB, to name just some examples. Each video decoder 214 may include one or more video codecs, such as but not limited to H.263, H.264, HEV, MPEG1, MPEG2, MPEG-TS, MPEG-4, Theora, 3GP, DV, DVCPRO, DVCPRO, DVCProHD, IMX, XDCAM HD, XDCAM HD422, and/or XDCAM EX, to name just some examples.

Now referring to both FIGS. 1 and 2, in some embodiments, the user 132 may interact with the media device 106 via, for example, the remote control 110. For example, the user 132 may use the remote control 110 to interact with the user interface module 206 of the media device 106 to select content, such as a movie, TV show, music, book, application, game, etc. The streaming module 202 of the media device 106 may request the selected content from the content server(s) 120 over the network 118. The content server(s) 120 may transmit the requested content to the streaming module 202. The media device 106 may transmit the received content to the display device 108 for playback to the user 132.

In streaming embodiments, the streaming module 202 may transmit the content to the display device 108 in real time or near real time as it receives such content from the content server(s) 120. In non-streaming embodiments, the media device 106 may store the content received from content server(s) 120 in storage/buffers 208 for later playback on display device 108.

Stochastic Candidate Selection for Content Recommendation

According to some embodiments, the system server 126 and/or the media device 106 can be configured to provide content recommendations to user 132. The system server 126 and/or the media device 106 can be configured to provide stochastic candidate selection for the content recommendation. The content recommendations can be selected from a pool of content candidates. According to some embodiments, at a first stage of the content recommendation, a first plurality of content candidates can be selected from the pool of content candidate. In some example, this selection in the first stage of the content recommendation can be based on popularity scores of the content candidates in the pool of content candidates. In the first stage of the content selection, the selected content candidates (the first plurality of content candidates) can be ranked based on their popularity score.

The system server 126 and/or the media device 106 can be configured to select a second plurality of content candidates from the first plurality of content candidates. According to some embodiments, the system server 126 and/or the media device 106 can use a statistically random (or substantially statistically random) algorithm to select the second plurality of content candidates from the first plurality of content candidates. This stochastic content candidate selection can be performed during a second stage of the content recommendation.

According to some embodiments, the system server 126 and/or the media device 106 can be configured to rank the second plurality of content candidates based on one or more parameters and select a third plurality of content candidates from the ranked second plurality of content candidates to provide to (e.g., display to) the users 132. For example, the system server 126 and/or the media device 106 can display the third plurality of content candidates using the media device 106 and/or the display devices 108. In some examples, ranking the second plurality of content candidates and/or selecting the third plurality of content candidates can be performed during a third stage of content recommendation.

As discussed above, the stochastic candidate selection for the content recommendation can be performed by the candidate selection system 150 as part of the system server 126 and/or the media device 106.

Figure 3:
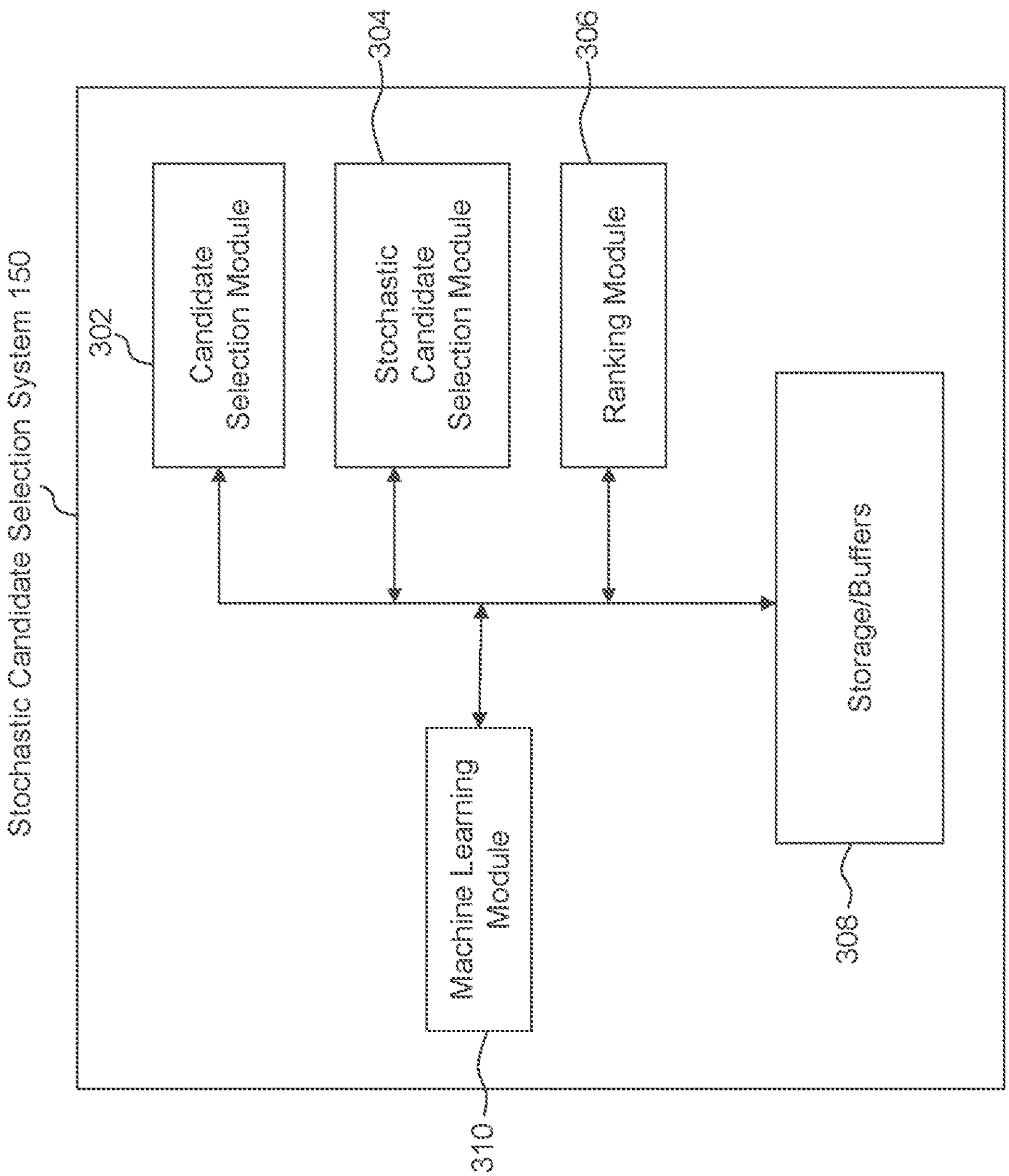
FIG. 3 illustrates a block diagram of a stochastic candidate selection system, according to some embodiments

FIG. 3 illustrates a block diagram of an example stochastic candidate selection system 150, according to some embodiments. The stochastic candidate selection system 150 can include a candidate selection module 302, a stochastic candidate selection module 304, a ranking module 306, storage/buffers 308, and a machine learning module 310. However, the embodiments of this disclosure are not limited to these systems/modules and the stochastic candidate selection system 150 can include other systems/modules.

According to some embodiments, the candidate selection module 302 can have access to a plurality of content candidates. For example, the candidate selection module 302 can access the content servers 120 to retrieve the plurality of content candidates from different content servers 120. According to some embodiments, the candidate selection module 302 can be configured to select a first set of content candidates from the plurality of content candidates that the candidate selection module 302 can access. In some implementations, the content selection module 302 can be configured to select the first set of content candidates based on a popularity score associated to each one of the plurality of content candidates that the candidate selection module 302 can access. For example, each content candidate in the plurality of content candidates that the candidate selection module 302 can access has a popularity score. The candidate selection module 302 may choose N content candidates (e.g., the first set of content candidates) that have the highest popularity scores. According to some embodiments, the popularity score can be determined for each content candidate based at least on any combination of a number of times the content candidate has been selected, a number of times the content candidate has been viewed, a number of times the content candidate has been searched for, a number of times the content candidate has been displayed to user, or the like.

Although the popularity score is discussed in some examples for the candidate selection module 302 to use to select the first set of content candidates, the embodiments of this disclosure can use other parameters to select the first set of content candidates from the plurality of content candidates. In a non-limiting example, the candidate selection module 302 can select about 400 to 2000 content candidates (e.g., N=400-2000) for the first set of content candidates. However, the embodiments of this disclosure are not limited to this example.

In some implementations, after selecting the first set of content candidates, the candidate selection module 302 can rank the content candidates in the first set. In some examples, the candidate selection module 302 can rank the content candidates based on their popularity scores discussed above. Additionally, or alternatively, the candidate selection module 302 can use other parameter(s) to rank the content candidates in the first set.

According to some embodiments, the popularity scores and/or other parameters can be stored in the storage/buffers 308. Additionally, or alternatively, the popularity scores and/or other parameters can be stored by the content servers 120, the system servers 126, and/or other systems within the multimedia environment 102. According to some embodiments, the popularity scores and/or other parameters can be determined and/or be updated using the machine learning (ML) module 310.

The ML module 310 can include one or more supervised learning algorithm such as, but not limited to, regression, decision tree, random forest, logistic regression, or the like. The ML module 310 can include support-vector machines classifier (SVMs, or support-vector networks), such as but not limited to, Maximal Margin classifier, one-of or one-vs-all classifier, linear SVM, nonlinear classifier, support-vector clustering, multiclass SVM, transductive SVM, structured SVM, regression SVM, Bayesian SVM, or the like. The ML module 310 can include unsupervised learning algorithms, such as, but not limited to, apriori algorithm, K-means, or the like. The ML module 310 can include reinforcement learning algorithms, such as, but not limited to, Markov decision process or the like. The ML module 310 can include a Naïve Bayes classifier, which may apply Bayes theorem. However, the embodiments of this disclosure are not limited to these examples and other the ML module 310 can include other ML algorithms and/or other artificial intelligence (AI) algorithms.

After the candidate selection module 302 selects the first set of content candidates, the stochastic candidate selection module 304 can be configured to select a second set of content candidates from the first set. For example, the stochastic candidate selection module 304 can be configured to select K content candidates (for the second set) from the N content candidates of the first set. In a non-limiting example, the stochastic candidate selection module 304 can be configured to select around 200 to 1000 (K=200-1000) content candidates for the second set. The embodiments of this disclosure are not limited to these numbers and can include any number of content candidates for the second set.

According to some embodiments, the stochastic candidate selection module 304 can be configured to use a statistically random (or substantially statistically random) algorithm to select the second set of content candidates from the first set of content candidates. According to some embodiments, the statistically random (or substantially statistically random) algorithm used by the candidate selection module 302 can include a reservoir sampling algorithm or a weighted sampling algorithm.

According to some embodiments, the reservoir sampling algorithm can include a family of randomized algorithms where a random sample of K content candidates can be selected from the population of N content candidates. According to some implementations, the size of the population of N content candidates is not known to the candidate selection module 302. In some examples, the selection of K content candidates is done without replacement.

According to some embodiments, the weighted sampling algorithm can include a method for selecting the K content candidates from the population of N content candidates statistically random (or substantially statistically random) where the N content candidates are weighted and the probability of each content candidate can be determined by its relative weight. In some implementations, the weight for each content candidate can be based on its popularity score. Additionally, or alternatively, the weight for each content candidate can be based on its relevance score (or ranking score), as discussed in more detail below. However, the embodiments of this disclosure are not limited to these examples, and the weights for the weighted sampling algorithm can include (or be based on) other parameters. For example, the weights of the weighted sampling algorithm can be based on popularity, similarity, impressions received, user's interaction with one or more contents, or the like.

According to some embodiments, the weight for each content candidate can be the same across different users. Additionally, or alternatively, the weight for each content candidate can be user specific, and different weights can be used for the same content candidate over different users. Additionally, or alternatively, the weight for each content candidate can be region specific, and different weights can be used for the same content candidate over different geographical regions. Additionally, or alternatively, the weight for each content candidate can be time specific, and different weights can be used for the same content candidate over different time of a day. In a non-limiting example, a mapping between any combination of the content candidates, the weights, users (e.g., using user identifiers), the geographical region, time of day, or the like can be stored in, for example, storage/buffers 308. This mapping can be updated and adapted during the operation of the stochastic candidate selection system 150. Other parameters can be used to determining and/or adapting the weight in order to customize the stochastic candidate selection system 150.

According to some embodiments, the weighted sampling algorithm includes a weighted function that can have different distributions with respect to the weights. In some implementations, the weighted function can be a linear function of the weights. In other implementations, the weighted function can be a non-linear function of the weights. Different distributions/functions of the weights can be used for the weighted sampling algorithms used by the stochastic candidate selection module 304.

According to some embodiments, the statistically random (or substantially statistically random) algorithm used by the candidate selection module 302 can include other randomized algorithms, where the candidate selection module 302 selects the second set of content candidates from the first set of content candidates using a degree of randomness as part the logic or the process of the candidate selection module 302.

According to some embodiments, the parameter(s) of the statistically random (or substantially statistically random) algorithm used by the stochastic candidate selection module 304 can be stored in storage/buffers 308. Additionally, or alternatively, the parameter(s) of the statistically random (or substantially statistically random) algorithm can be stored by the content servers 120, the system servers 126, and/or other systems within the multimedia environment 102. According to some embodiments, the parameter(s) of the statistically random (or substantially statistically random) algorithm can be determined and/or be updated using the ML module 310.

After the stochastic candidate selection module 304 selects the second set of content candidates, the ranking module 306 can rank the content candidates in the second set to generate a ranked second set of content candidates. In some implementations, the ranking module 304 is configured to rank the second set of content candidate based on one or more parameters. The one or more parameters can be associated with a user to whom the content is to be recommended. For example, the one or more parameters associated with the user can include relevance score (or ranking score). The relevance score of a content candidate can indicate how and how much that content candidate is relevant to the user. In some examples, the relevance score can be determined based on the history of the user's interaction with that content candidate and/or similar content candidates. For example, the relevance score can be determined based on any combination of the ratings that the user have given to the content candidate and/or similar content candidates, the number of times the user has requested or viewed the content candidate and/or similar content candidates, previous ranking of the content candidate and/or similar content candidates, the rankings of the content candidate and/or similar content candidates for similar users, or the like.

The embodiments of this disclosure are not limited to these examples and the relevance score can be determined using other methods. Additionally, the one or more parameters used by the ranking module 306 can include other scores/parameters.

According to some embodiments, the one or more parameters used by the ranking module 306 can be stored in storage/buffers 308. Additionally, or alternatively, the one or more parameters used by the ranking module 306 can be stored by the content servers 120, the system servers 126, and/or other systems within the multimedia environment 102. According to some embodiments, the one or more parameters used by the ranking module 306 can be determined and/or be updated using the ML module 310.

According to some embodiments, in addition to ranking the second set of content candidates, the ranking module 306 can be configured to select a third set of content candidates from the second set of content candidates. In some implementations, the ranking module 306 can select first P content candidates from the ranked second set to generate a third set of content candidates. The first P content candidates can include the first P content candidates with the highest rankings in the ranked second content candidate. Additionally, or alternatively, the ranking module 306 can select the P content candidates using one or more of the statistically random (or substantially statistically random) algorithms discussed above. The ranking module 306 can use other methods to select the third set of content candidates. In a non-limiting example, the third set of content candidates can include about 40 content candidates (e.g., P=40). However, the embodiments of this disclosure are not limited to this example.

In some embodiments, the ranking module 306 can apply impression discount algorithms to the ranked second set of content candidates (or the third set of content candidates). According to some implementations, the impression discount algorithms can be used to remove or lower a rank of one or more contents if the user has not interacted with those contents. In some examples, the impression discount algorithms can be applied to (or be used as) the weights of the weighted sampling algorithms.

The ranked second set of content candidates (or the third set of content candidates) can be provided to the user as content recommendation. In some implementations, the stochastic candidate selection system 150 can provide the ranked second set of content candidates (or the third set of content candidates) to the user. For example, the stochastic candidate selection system 150 can display the ranked second set of content candidates (or the third set of content candidates) on display device 108. The stochastic candidate selection system 150 can provide the ranked second set of content candidates (or the third set of content candidates) to the user using other methods and systems.

According to some embodiments, the stochastic candidate selection module 304 can change the set of content candidates that are input to the ranking module 306 during the iterations of the operation of the stochastic candidate selection system 150. In other words, even if the set of content candidates input to the stochastic candidate selection module 304 (from the candidate selection module 302) is substantially the same during the iteration of the operation of the stochastic candidate selection system 150, the output of the stochastic candidate selection module 304 can significantly change because of using the statistically random (or substantially statistically random) algorithms, according to some embodiments.

According to some embodiments, by using the statistically random (or substantially statistically random) algorithms, the diversity of the content recommendation to the user can increase. For example, the user will have exposure to more content candidates when the stochastic candidate selection module 304 uses the statistically random (or substantially statistically random) algorithms. In other words, even if the popularity scores and/or the relevance scores may become almost fixed after a period of time, by using the statistically random (or substantially statistically random) algorithms, the stochastic candidate selection module 304 can diversify the content recommendation to the user.

According to some embodiments, by using the statistically random (or substantially statistically random) algorithms, a bounce rate can be reduced. The bounce rate can be a fraction of visits in which a user leaves the media system 104 after the user's first visit. By using the statistically random (or substantially statistically random) algorithms, the stochastic candidate selection module 304 can increase the user engagement. The user engagement can be increased for, for example, first time and/or low engagement users. Additionally, by using the statistically random (or substantially statistically random) algorithms, the stochastic candidate selection module 304 can increase user retention. Also, by using the statistically random (or substantially statistically random) algorithms, the stochastic candidate selection module 304 can increase diversity for advertising-based video on demand (AVOD) and/or subscription video on demand (SVOD).

According to some embodiments, the first time that a user uses the stochastic candidate selection system 150, the stochastic candidate selection module 304 can be disabled. In other words, the stochastic candidate selection system 150 uses the candidate selection module 302 and the ranking module 306 to provide content recommendation to the user when the user is using the stochastic candidate selection system 150 for the first time. After the first use, the stochastic candidate selection module 304 can be enabled for the subsequent uses of the stochastic candidate selection system 150.

In some implementations, the stochastic candidate selection system 150 can update its content recommendation (e.g., the ranked second set of content candidates or the third set of content candidates discussed above) periodically. For example, the stochastic candidate selection system 150 can update its content recommendation once a week, once a day, once a few hour, or the like. Additionally, or alternatively, the stochastic candidate selection system 150 can update its content recommendation each time a user is using the media device 106 and/or the display device 108. Additionally, or alternatively, the stochastic candidate selection system 150 can update its content recommendation in response to a request from the user. For example, the remote control 110 can include a key that can be used by the user to request the stochastic candidate selection system 150 to update its content recommendation. In another example, the media device 106 can display an option using the display device 108 that when selected by the user the stochastic candidate selection system 150 can update its content recommendation. However, other methods can be used by the stochastic candidate selection system 150 to update its content recommendation.

According to some embodiments, the candidate selection module 302 and the ranking module 306 can be combined. In these examples, the stochastic candidate selection module 304 can be applied to the result of the combination of the candidate selection module 302 and the ranking module 306. For example, the combination of the candidate selection module 302 and the ranking module 306 can select the first set of content candidates (e.g., the N content candidates) based on, for example, the popularity scores. Then, the combination of the candidate selection module 302 and the ranking module 306 can rank the first set of content candidates using, for example, the relevance score. Then, the stochastic candidate selection module 304 can be configured to select a second set of content candidates from the ranked first set using, for example, one or more the statistically random (or substantially statistically random) algorithms discussed above. The second set of content candidates (or a subset of the second set) can be provided to the user as the content recommendation.

According to some embodiments, the content recommendation can include the set of content candidates, the ranked second set of content candidates, or the third set of content candidates discussed above with respect to different implementations. In some embodiments, before providing the content recommendation to the user, the stochastic candidate selection system 150 can compare the content candidates in the current content recommendation with the content candidates in a previous content recommendation. If the current content recommendation include content candidates that were present in the previous content recommendation, the stochastic candidate selection system 150 can remove those content candidates and replace them with different content candidates.

According to some embodiments, the stochastic candidate selection system 150 can use the user's feedback to the content recommendation to train and/or update the ML module 310. In some implementations, the stochastic candidate selection system 150 can use the user's feedback to update one or more parameters (e.g., the popularity scores) used by the candidate selection module 302. Additionally, or alternatively, the stochastic candidate selection system 150 can use the user's feedback to update one or more parameters (e.g., weights used for the statistically random (or substantially statistically random) algorithms) used by the stochastic candidate selection module 304. Additionally, or alternatively, the stochastic candidate selection system 150 can use the user's feedback to update one or more parameters (e.g., the relevance scores) used by the ranking module 306.

In some embodiments, the user's feedback to the content recommendation can include any combination of user's requesting an update to the content recommendation, user's selecting content candidates that the user had not selected before, user not selecting content candidates that the user had not selected before, user's selection of different content similar to the content candidates in the content selection, or the like.

Figure 4:
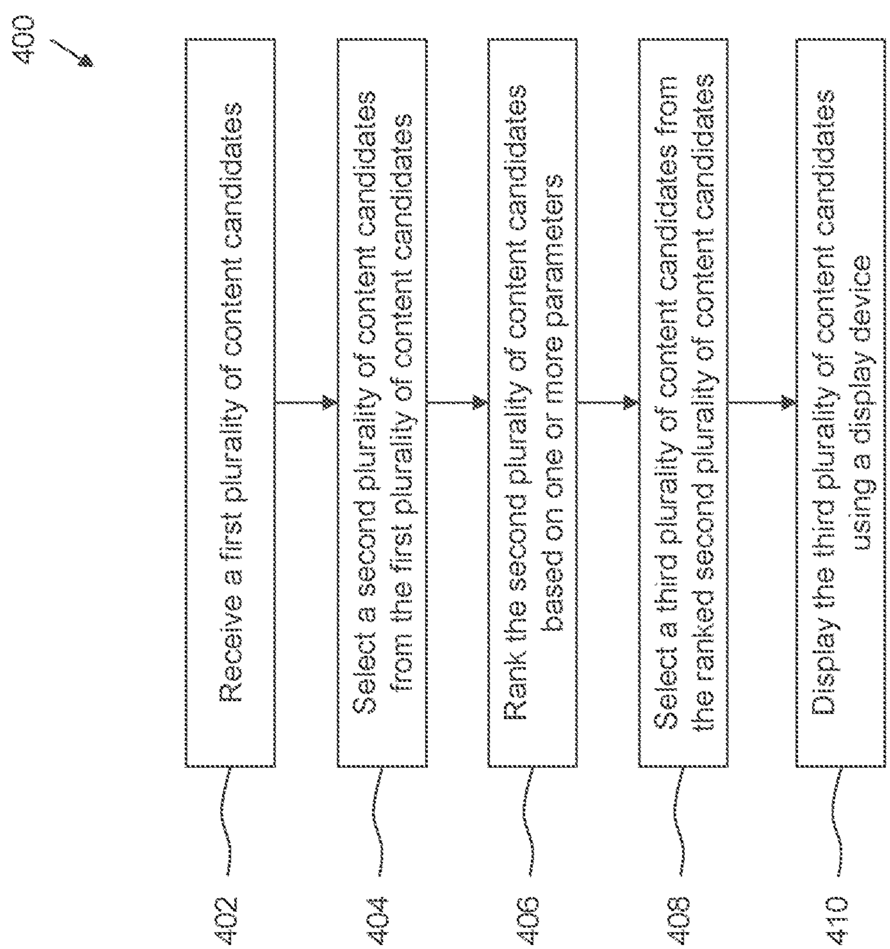
FIG. 4 illustrates an example method for stochastic candidate selection for content recommendation, according to some embodiments.

FIG. 4 illustrates an example method 400 for stochastic candidate selection for content recommendation, according to some embodiments. As a convenience and not a limitation, FIG. 4 may be described with regard to elements of FIGS. 1-3. Method 400 may represent the operation of a stochastic candidate selection system (e.g., the stochastic candidate selection system 150 of FIGS. 1 and 3) for stochastic candidate selection for content recommendation. But method 400 is not limited to the specific aspects depicted in those figures and other systems may be used to perform the method as will be understood by those skilled in the art. It is to be appreciated that not all operations may be needed, and the operations may not be performed in the same order as shown in FIG. 4.

At 402, a first plurality of content candidates are received. For example, the stochastic candidate selection module 304 can receive the first plurality of content candidates (e.g., the first set of content candidates discussed above) from the candidate selection module 302. According to some embodiments the first plurality of content candidates can be selected from a pool of content candidates, as discussed above. For example, the candidate selection module 302 can be configured to select the first plurality of content candidates from a pool of content candidates that the candidate selection module 302 can access.

In some implementations, the content selection module 302 can be configured to select the first plurality of content candidates based on a first criteria. The content selection module 302 can also be configured to rank the first plurality of the content candidates based on the first criteria. In some examples, the first criteria can include a popularity score associated to each one of the content candidates that the candidate selection module 302 can access.

At 404, a second plurality of content candidates is selected from the first plurality of content candidates. For example, the stochastic candidate selection module 304 can select the second plurality of content candidates (e.g., the second set of content candidates discussed above) from the first plurality of content candidates. According to some embodiments, the stochastic candidate selection module 304 can select the second plurality of content candidates using statistically random (or substantially statistically random) algorithms discussed above. For example, the stochastic candidate selection module 304 can randomly or substantially randomly select the second plurality of content candidates.

In some examples, the randomly (or substantially randomly) selecting the second plurality of content candidates can include applying a weighted function to the first plurality of content candidates to randomly (or substantially randomly) select the second plurality of content candidates. For example, the stochastic candidate selection module 304 can select the second plurality of content candidates using a reservoir sampling algorithm or a weighted sampling algorithm. The weighted function can include any combination of reservoir sampling algorithm, a weighted sampling algorithm, or the like.

In some examples, the stochastic candidate selection system 150 or the stochastic candidate selection module 304 can determine one or more weights of the weighted function based on one or more parameters associated with user preferences. For example, the one or more weights of the weighted function can be determined based on one or more parameters associated with a second criteria different from the first criteria discussed above. In some examples, the second criteria can include a plurality of relevance scores discussed above. In other words, the one or more weights of the weighted function can be determined based on the relevance scores discussed above. However, the embodiment of this disclosure are not limited to these examples and the one or more weights can be determined using other parameters discussed above.

According to some embodiments, the weighted function can have different distributions with respect to the weights. In some implementations, the weighted function can be a linear function of the weights. In other implementations, the weighted function can be a non-linear function of the weights. The non-linear function can include, but is not limited to, exponential function, normal distribution, or the like.

In some examples, the one or more weights of the weighted function can be determined and/or updated using a machine learning mechanism. For example, the one or more weights can be determined and/or updated using the ML module 310.

At 406, the second plurality of content candidates are ranked based on one or more parameters. For example, the ranking module 306 can rank the second plurality of content candidates (e.g., the second set of content candidates discussed above) based on one or more parameters to generate a ranked second plurality of content candidates (e.g., the ranked second set discussed above). In some examples, the one or more parameters can include one or more parameters associated with the user preferences. For example, the one or more parameters can include one or more parameters can include relevance score(s).

At 408, a third plurality of content candidates is selected from the ranked second plurality of content candidates. For example, the ranking module 306 can select the third plurality of content candidates (e.g., the third set of content candidates discussed above) from the ranked second plurality of content candidates.

At 410, the third plurality of content candidates and/or the ranked second plurality of content candidates are provided to a user. For example, the third plurality of content candidates and/or the ranked second plurality of content candidates are displayed to the user using a display device. In other words, the stochastic candidate selection system 150 can provide the content recommendation to the user by providing the third plurality of content candidates and/or the ranked second plurality of content candidates.

According to some embodiments, the one or more weights of the weighted function can be updated based on user's feedback in response to the content recommendation. For example, the stochastic candidate selection system 150 can receive one or more content candidate selections selected from the third plurality of content candidates and/or the ranked second plurality of content candidates. For example, the user can select one or more of the content candidate from the third plurality of content candidates and/or the ranked second plurality of content candidates. Based on the selection, the stochastic candidate selection system 150 can modify the one or more weights of the weighted function. In a non-limiting example, each weight for a corresponding content candidate can be based on the relevance score of the content candidate. If the content candidate (or a content similar to the content candidate) is selected by the user, the weight and the relevance score of that content candidate can be increased. Additionally, or alternatively, if the content candidate (or a content similar to the content candidate) is not selected by the user, the weight and the relevance score of that content candidate can be decreased. However, other methods can be used to update the one or more weights based on the user's feedback.

According to some embodiments, the stochastic candidate selection system 150 can compare the current content recommendation with previous content recommendations before providing to the content recommendation to the user. In some implementations, the stochastic candidate selection module 304 can select a fourth plurality of content candidates from the first plurality of content candidates and compare the fourth plurality of content candidates with the second plurality of content candidates. In response to the comparison, the stochastic candidate selection module 304 can remove, from the fourth plurality of content candidates, one or more candidates that are same in the fourth plurality of content candidates and the second plurality of content candidates to generate a fifth plurality of content candidates. The ranking module 306 can rank the fifth plurality of content candidates based on the one or more parameters. In some implementations, the ranking module 306 can further select a sixth plurality of content candidates from the ranked fifth plurality of content candidates. The sixth plurality of content candidate can be provided to the user (e.g., be displayed using the display device).

Although the comparison with previous content candidate was discussed above at the stochastic candidate selection module 304, this comparison and removal of repeated content candidates can be performed by the candidate selection module 302 and/or the ranking module 306. For example, the ranking module 306 can compare the current content candidates that the ranking module 306 receives from the stochastic candidate selection module 304 with the previous set of content candidate that the ranking module 306 had received from the stochastic candidate selection module 304. The ranking module 306 can remove duplicate content candidates in response to this comparison.

Example Computer System

Figure 5:
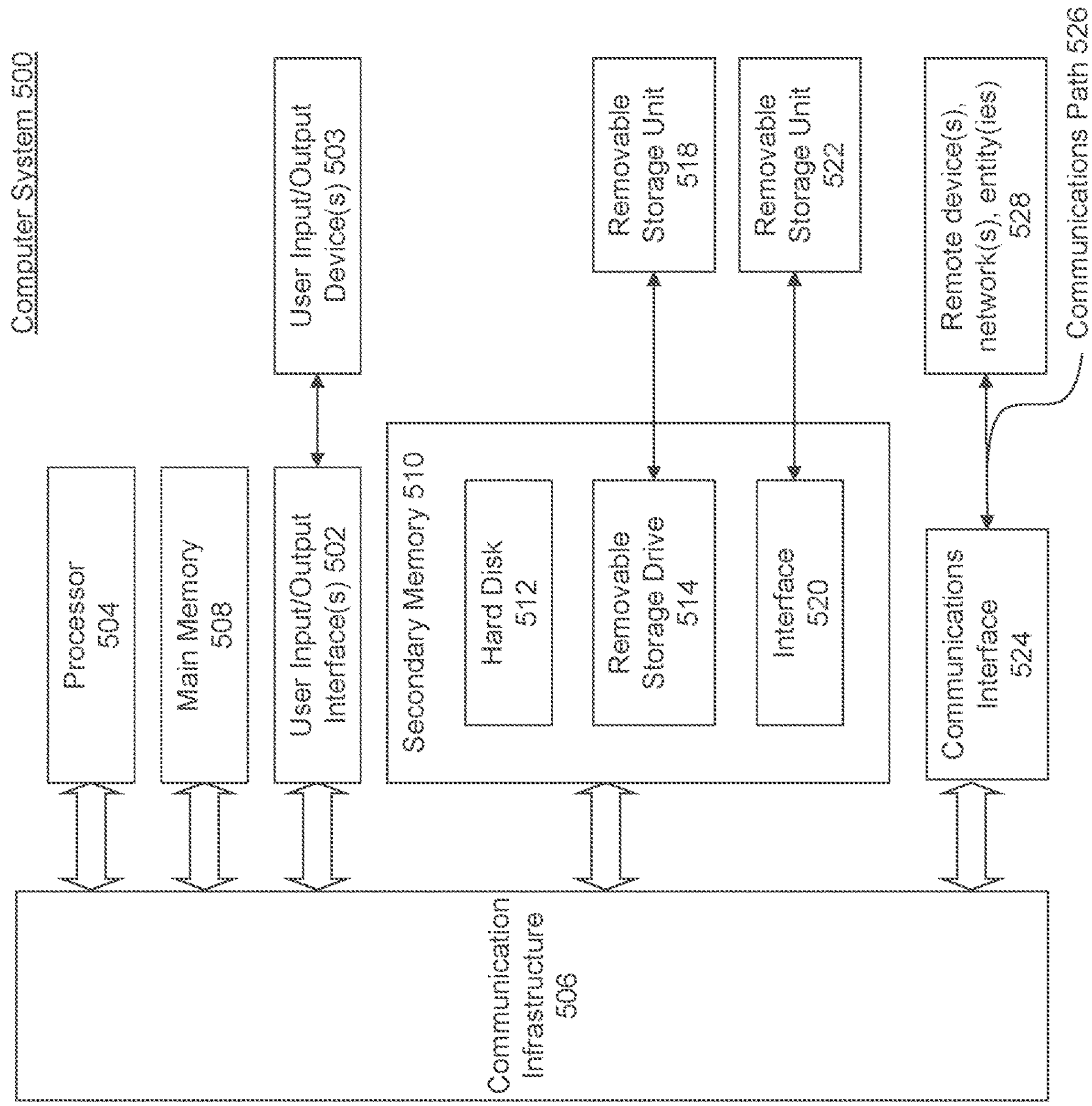
FIG. 5 illustrates an example computer system that can be used for implementing various embodiments.

Various embodiments may be implemented, for example, using one or more well-known computer systems, such as computer system 500 shown in FIG. 5. For example, the media device 106 may be implemented using combinations or sub-combinations of computer system 500. Also or alternatively, the stochastic candidate selection system 150 may be implemented using combinations or sub-combinations of computer system 500. Also or alternatively, one or more computer systems 500 may be used, for example, to implement any of the embodiments discussed herein, as well as combinations and sub-combinations thereof.

Computer system 500 may include one or more processors (also called central processing units, or CPUs), such as a processor 504. Processor 504 may be connected to a communication infrastructure or bus 506.

Computer system 500 may also include user input/output device(s) 503, such as monitors, keyboards, pointing devices, etc., which may communicate with communication infrastructure 506 through user input/output interface(s) 502.

One or more of processors 504 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 500 may also include a main or primary memory 508, such as random access memory (RAM). Main memory 508 may include one or more levels of cache. Main memory 508 may have stored therein control logic (i.e., computer software) and/or data.

Computer system 500 may also include one or more secondary storage devices or memory 510. Secondary memory 510 may include, for example, a hard disk drive 512 and/or a removable storage device or drive 514. Removable storage drive 514 may be a floppy disk drive, a magnetic tape drive, a compact disk drive, an optical storage device, tape backup device, and/or any other storage device/drive.

Removable storage drive 514 may interact with a removable storage unit 518. Removable storage unit 518 may include a computer usable or readable storage device having stored thereon computer software (control logic) and/or data. Removable storage unit 518 may be a floppy disk, magnetic tape, compact disk, DVD, optical storage disk, and/any other computer data storage device. Removable storage drive 514 may read from and/or write to removable storage unit 518.

Secondary memory 510 may include other means, devices, components, instrumentalities or other approaches for allowing computer programs and/or other instructions and/or data to be accessed by computer system 500. Such means, devices, components, instrumentalities or other approaches may include, for example, a removable storage unit 522 and an interface 520. Examples of the removable storage unit 522 and the interface 520 may include a program cartridge and cartridge interface (such as that found in video game devices), a removable memory chip (such as an EPROM or PROM) and associated socket, a memory stick and USB or other port, a memory card and associated memory card slot, and/or any other removable storage unit and associated interface.

Computer system 500 may further include a communication or network interface 524. Communication interface 524 may enable computer system 500 to communicate and interact with any combination of external devices, external networks, external entities, etc. (individually and collectively referenced by reference number 528). For example, communication interface 524 may allow computer system 500 to communicate with external or remote devices 528 over communications path 526, which may be wired and/or wireless (or a combination thereof), and which may include any combination of LANs, WANs, the Internet, etc. Control logic and/or data may be transmitted to and from computer system 500 via communication path 526.

Computer system 500 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 500 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 500 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 500, main memory 508, secondary memory 510, and removable storage units 518 and 522, as well as tangible articles of manufacture embodying any combination of the foregoing. Such control logic, when executed by one or more data processing devices (such as computer system 500 or processor(s) 504), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 5. In particular, embodiments can operate with software, hardware, and/or operating system implementations other than those described herein.

CONCLUSION

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A computer-implemented method for stochastic candidate selection for content recommendation, the computer-implemented method comprising:

receiving, by at least one computer processor, a first plurality of content candidates;

ranking the first plurality of content candidates based on a first criteria;

selecting a second plurality of content candidates from the ranked first plurality of content candidates;

ranking the second plurality of content candidates based on one or more parameters, wherein the one or more parameters are associated with a second criteria, wherein the first criteria is different from the second criteria, wherein the first criteria comprises a plurality of popularity scores, each one of the plurality of popularity scores being associated with each one of the first plurality of content candidates and the second criteria comprises a plurality of relevance scores, each one of the plurality of relevance scores being associated with each one of the second plurality of content candidates;

selecting a third plurality of content candidates from the ranked second plurality of content candidates; and displaying the third plurality of content candidates using a display device.

2. The computer-implemented method of claim 1, wherein the selecting the second plurality of content candidates comprises randomly selecting the second plurality of content candidates.

3. The computer-implemented method of claim 2, wherein the randomly selecting the second plurality of content candidates comprises applying a weighted function to the first plurality of content candidates to randomly select the second plurality of content candidates.

4. The computer-implemented method of claim 3, wherein one or more weights of the weighted function are determined based on the one or more parameters and wherein the one or more parameters are associated with user preferences.

5. The computer-implemented method of claim 3, wherein one or more weights of the weighted function are determined using a machine learning mechanism.

6. The computer-implemented method of claim 3, further comprising:

receiving one or more content candidate selections selected from the third plurality of content candidates; and modifying one or more weights of the weighted function based on the one or more content candidate selections.

7. The computer-implemented method of claim 1, further comprising:

selecting a fourth plurality of content candidates from the first plurality of content candidates;

comparing the fourth plurality of content candidates with the second plurality of content candidates;

removing, from the fourth plurality of content candidates, one or more candidates that are same in the fourth plurality of content candidates and the second plurality of content candidates to generate a fifth plurality of content candidates;

ranking the fifth plurality of content candidates based on the one or more parameters;

selecting a sixth plurality of content candidates from the ranked fifth plurality of content candidates; and displaying the sixth plurality of content candidates using the display device.

8. A system, comprising:

one or more memories; and at least one processor each coupled to at least one of the memories and configured to perform operations comprising:

receiving a first plurality of content candidates;

ranking the first plurality of content candidates based on a first criteria;

randomly selecting a second plurality of content candidates from the ranked first plurality of content candidates;

ranking the second plurality of content candidates based on one or more parameters, wherein the one or more parameters are associated with a second criteria, wherein the first criteria is different from the second criteria, wherein the first criteria comprises a plurality of popularity scores, each one of the plurality of popularity scores being associated with each one of the first plurality of content candidates and the second criteria comprises a plurality of relevance scores, each one of the plurality of relevance scores being associated with each one of the second plurality of content candidates;

selecting a third plurality of content candidates from the ranked second plurality of content candidates; and displaying the third plurality of content candidates using a display device.

9. The system of claim 8, wherein the randomly selecting the second plurality of content candidates comprises applying a weighted function to the first plurality of content candidates.

10. The system of claim 9, wherein one or more weights of the weighted function are determined based on the one or more parameters and wherein the one or more parameters are associated with user preferences.

11. The system of claim 9, wherein one or more weights of the weighted function are determined using a machine learning mechanism.

12. The system of claim 9, the operations further comprising:

receiving one or more content candidate selections selected from the third plurality of content candidates; and modifying one or more weights of the weighted function based on the one or more content candidate selections.

13. A non-transitory computer-readable medium having instructions stored thereon that, when executed by at least one computing device, cause the at least one computing device to perform operations comprising:

receiving a first plurality of content candidates;

ranking the first plurality of content candidates based on a first criteria;

randomly selecting a second plurality of content candidates from the ranked first plurality of content candidates;

ranking the second plurality of content candidates based on one or more parameters, wherein the one or more parameters are associated with a second criteria, wherein the first criteria is different from the second criteria, wherein the first criteria comprises a plurality of popularity scores, each one of the plurality of popularity scores being associated with each one of the first plurality of content candidates and the second criteria comprises a plurality of relevance scores, each one of the plurality of relevance scores being associated with each one of the second plurality of content candidates;

selecting a third plurality of content candidates from the ranked second plurality of content candidates; and displaying the third plurality of content candidates using a display device.

14. The non-transitory computer-readable medium of claim 13, wherein the randomly selecting the second plurality of content candidates comprises applying a weighted function to the first plurality of content candidates.

15. The non-transitory computer-readable medium of claim 14, wherein one or more weights of the weighted function are determined based on the one or more parameters and wherein the one or more parameters are associated with user preferences.

16. The non-transitory computer-readable medium of claim 14, wherein one or more weights of the weighted function are determined using a machine learning mechanism.

17. The non-transitory computer-readable medium of claim 14, the operations further comprising:

receiving one or more content candidate selections selected from the third plurality of content candidates; and modifying one or more weights of the weighted function based on the one or more content candidate selections.

* * * * *